US006186083B1

(12) United States Patent
Toto

(10) Patent No.: US 6,186,083 B1
(45) Date of Patent: Feb. 13, 2001

(54) DIGGER FOR FACILITATING THE APPLICATION OF A MATERIAL TO A MUSHROOM BED

(75) Inventor: Remo Toto, Lincoln University, PA (US)

(73) Assignee: Remo's Mushroom Services, Inc., Avondale, PA (US)

(*) Notice: Under 35 U.S.C. 154(b), the term of this patent shall be extended for 0 days.

(21) Appl. No.: 09/263,387

(22) Filed: Mar. 5, 1999

(51) Int. Cl.[7] .................................................. A01C 7/08
(52) U.S. Cl. .......................... 111/131; 172/125; 172/60; 221/222
(58) Field of Search ................................... 111/118, 120, 111/121, 122, 131, 130, 132, 133; 403/343, 342, 362; 221/209, 217, 221, 222, 277; 172/35, 45, 60, 85, 125, 518

(56) References Cited

U.S. PATENT DOCUMENTS

| 1,571,481 | 2/1926 | Kasmeier . |
| 2,072,331 | 3/1937 | Hanna . |
| 2,173,771 | 9/1939 | Taylor . |
| 2,539,253 | 1/1951 | Jorgensen . |
| 2,545,059 | 3/1951 | Ward . |
| 2,690,145 | 9/1954 | Romain . |
| 2,723,493 | 11/1955 | Stoller . |
| 3,560,190 | 2/1971 | Hughes et al. . |
| 3,704,752 | 12/1972 | Piacentino . |
| 3,704,816 | * 12/1972 | Gandrud ................................ 222/368 |
| 3,837,759 | * 9/1974 | Bittern ............................... 403/343 X |
| 3,851,604 | * 12/1974 | Seifert, Jr. ............................... 111/77 |
| 3,961,938 | 6/1976 | Iizuka et al. . |
| 3,970,012 | 7/1976 | Jones, Sr. . |
| 4,213,504 | * 7/1980 | Schneider ......................... 403/343 X |
| 4,273,495 | 6/1981 | Pannell . |
| 4,359,952 | * 11/1982 | Gesior et al. ........................... 111/80 |
| 4,421,543 | 12/1983 | Holtz . |
| 4,512,103 | 4/1985 | Coulthard et al. . |
| 4,537,613 | 8/1985 | Pebeyre et al. . |
| 4,764,199 | 8/1988 | Pratt et al. . |
| 4,776,872 | 10/1988 | Mulleavy et al. . |
| 4,821,959 | * 4/1989 | Browning ............................. 239/121 |
| 4,834,004 | * 5/1989 | Butuk et al. ......................... 111/200 |
| 4,990,173 | 2/1991 | Katz et al. . |
| 5,085,536 | * 2/1992 | Pelton ............................... 403/343 X |
| 5,133,270 | * 7/1992 | Ledermann et al. .................. 111/130 |
| 5,189,965 | * 3/1993 | Hobbs et al. ........................ 111/178 |
| 5,511,497 | 4/1996 | Toto . |
| 5,549,060 | * 8/1996 | Schick et al. ........................ 111/178 |
| 5,992,338 | * 11/1999 | Romans ............................. 111/171 |
| 6,004,083 | * 12/1999 | Huggins et al. .................. 403/343 X |

FOREIGN PATENT DOCUMENTS

| 1039118 | 9/1970 | (CA) . |
| 90-239295/32 | 3/1990 | (GB) . |

* cited by examiner

Primary Examiner—Victor Batson
(74) Attorney, Agent, or Firm—Connolly Bove Lodge Hutz LLP

(57) ABSTRACT

A digger for facilitating the application of a material to a mushroom bed includes a feed system wherein a metering shaft is provided in the compartment or hopper for the material. The metering shaft contains sets of supply pockets which receives the material to be conveyed to distribution heads. The digger also includes a digging shaft connected to a drive shaft by improved structure.

17 Claims, 5 Drawing Sheets

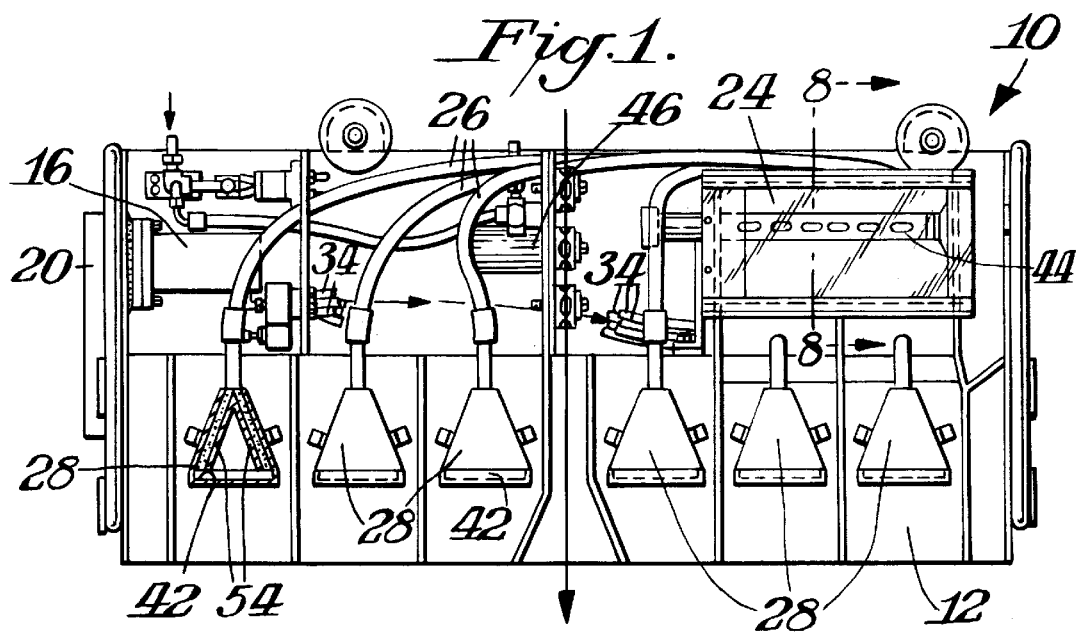
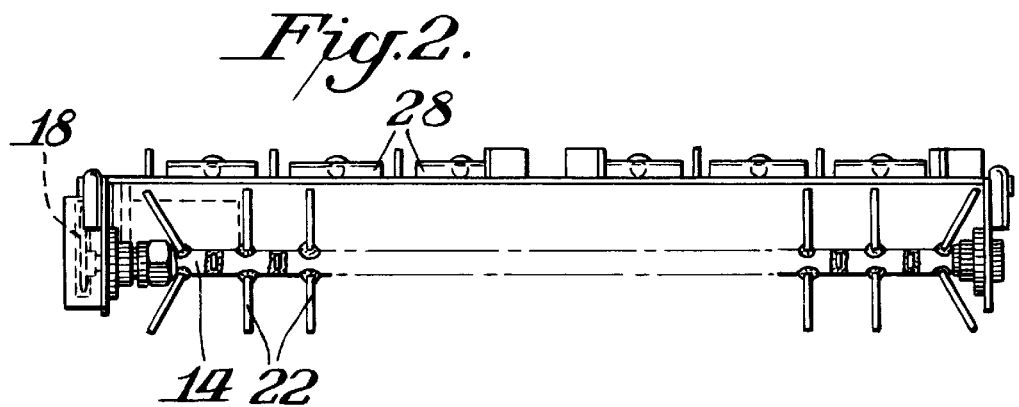
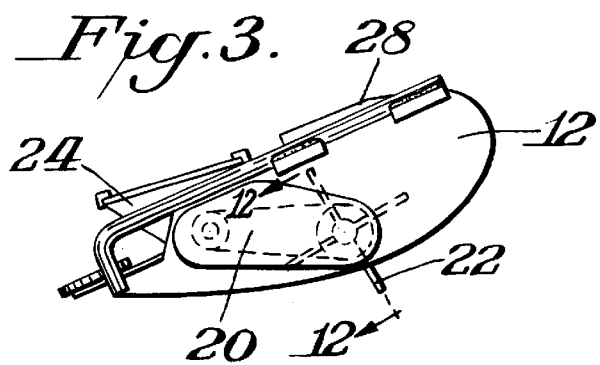

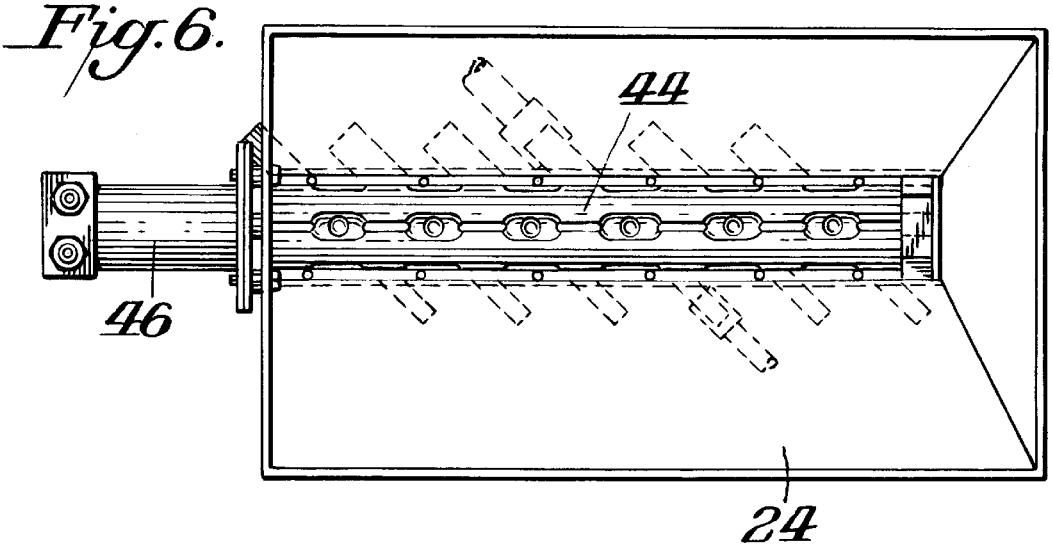
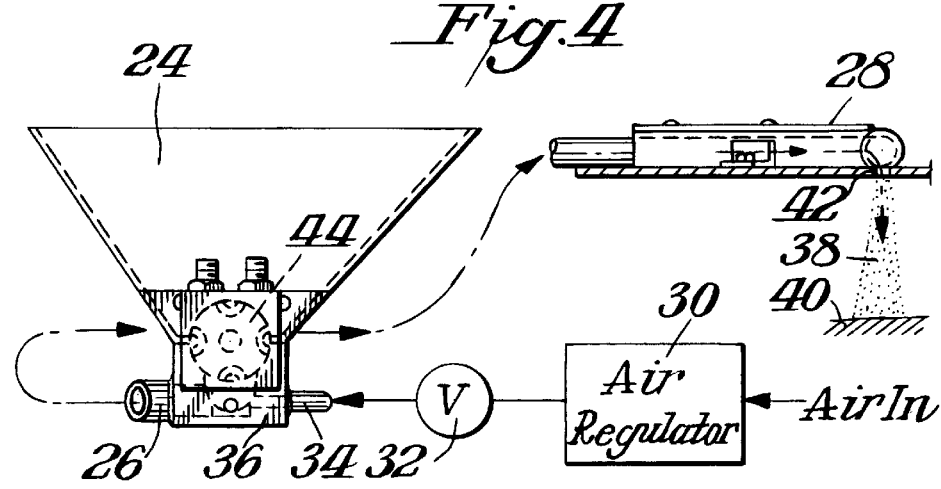
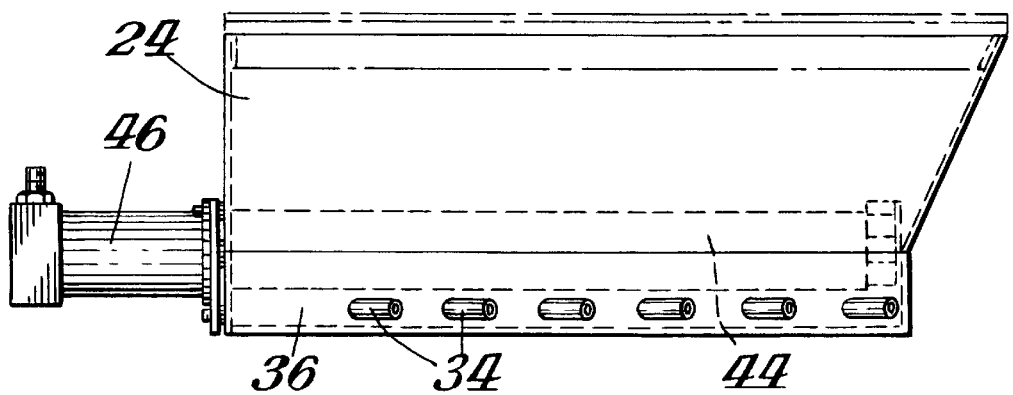

DIGGER FOR FACILITATING THE APPLICATION OF A MATERIAL TO A MUSHROOM BED

BACKGROUND OF THE INVENTION

In my U.S. Pat. No. 5,511,497 I disclosed a digger for facilitating the application of a material such as a supplement to a mushroom bed. As disclosed therein, the digger includes a rotating shaft having a plurality of outwardly extending tines which dig into the mushroom bed as the digger is being pulled longitudinally over the bed. The shaft is mounted in a housing or shroud which contains most of the other elements of the digger, including the motorized drive assembly for the shaft. A compartment containing the materials to be applied is also connected to the shroud and includes various hoses which lead from the compartment. Air is utilized to dispense the material from the compartment by feeding the air through tubing into a manifold at the top of the compartment. The manifold has a plurality of individual discharge hoses each having a flow control valve. Each hose leads to a head at the bottom of the compartment. The top of each head includes openings which function as a venturi opening to draw the supplement material into the head and then the supplement/air flow continues through a set of tubes, each of which is associated with the venturi openings. Each of these tubes leads to a respective delivery head mounted to the shroud. The supplement is discharged from ports in the delivery head at a location near the rotating tines so that the supplement is applied in the area of the compost where the tines are performing the digging act.

It would be desirable if a digger as disclosed in my patent could be provided with some structure to assure proper delivery of the material being applied to the mushroom bed.

It would also be desirable if some structure could be provided to eliminate problems with digger shaft failure.

SUMMARY OF THE INVENTION

An object of this invention is to provide a digger of the above type which meets the above needs.

A further object of this invention is to provide such a digger which would effectively apply material such as supplement or spawn to the compost of a mushroom bed.

In accordance with this invention a digger of the above type includes a power driven metering shaft at the bottom of the material holding compartment. The metering shaft has a plurality of sets of supply pockets for collecting the material from the compartment during rotation of the metering shaft and then depositing the material so that it could be conveyed by outlet hoses to a respective number of distributor heads located near the tines of the digging shaft. Preferably, each set of supply pockets includes a plurality of supply pockets which are equally spaced around the circumference of the shaft. Preferably, each set of supply pockets deposits the material into a corresponding number of receiving pockets in a manifold. An air inlet hose is connected on the upstream side of the manifold to direct flow into the receiving pockets and discharge the material/air into a larger outlet hose which in turn leads to the distributor heads.

In a preferred practice of this invention a supply pocket from each set of circumferentially aligned pockets is connected to a supply pocket from an adjacent set by a breaker bridge which is preferably in the form of an inverted shallow V-shaped groove to assure that the material from the compartment will be discharged into the supply pockets rather than caking or clogging in the compartment. Thus, in effect, the metering shaft includes a continuous groove across the bottom of the compartment with spaced portions of the groove being of greater depth to comprise the supply pockets so that there are no dead areas at the bottom of the compartment.

In accordance with a further practice of this invention the digger shaft is a hollow shaft which receives a reduced diameter stub portion of a drive shaft. The reduced diameter portion or stub portion is connected to an enlarged drive portion of the drive shaft which in turn is connected to the digging shaft. By having the drive portion of enlarged diameter there is less possibility of failure in the operation of the digging shaft. In a preferred practice of this aspect of the invention an internally threaded nut is permanently attached to the outside of the digging shaft and is threadably engaged with an externally threaded surface of the drive portion of the drive shaft to effectively secure the drive shaft and digging shaft together.

A BRIEF DESCRIPTION OF THE DRAWINGS:

FIG. 1 is top plan view of a digger in accordance with this invention;

FIG. 2 is a front elevational view of the digger shown in FIG. 1;

FIG. 3 is a left side elevational view of the digger shown in FIGS. 1–2;

FIG. 4 is a schematic end elevational view showing operation of the material conveying system for the digger of FIGS. 1–3;

FIG. 5 is a side elevational view of the compartment in the digger of FIGS. 1–4;

FIG. 6 is a top plan view of the compartment shown in FIG. 5;

DETAILED DESCRIPTION

Figure 7:
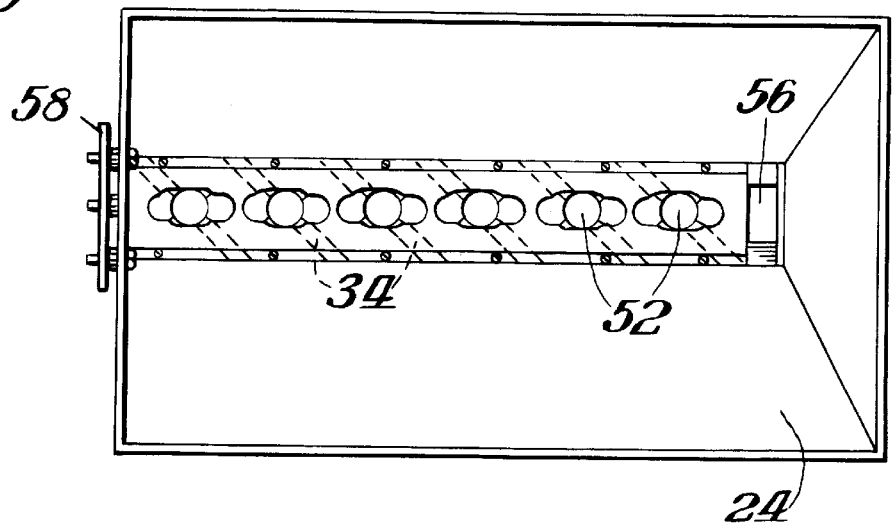
FIG. 7 is a top plan view of the compartment shown in FIGS. 5–6 with the metering shaft removed.

The present invention may be used with various types of diggers for facilitating the application of material to a mushroom bed. Such material may be supplement such as soya beans and cornmeal. Materials other than supplements, however, may also be applied, such as spawn or any other type of material which would be beneficial to apply to a mushroom bed. In such diggers a digging shaft having radially extending tines is pulled longitudinally over the mushroom bed so that the tines can rotate into the compost and thus prepare the compost to receive the material. The material is then applied to the treated compost.

In my U.S. Pat. No. 5,511,497 I describe a particularly effective digger to which the features of this invention may be applied. All of the details of U.S. Pat. No. 5,511,497 are incorporated herein by reference thereto. To the extent that the present invention is used in such a digger a repetition of all of the details of the digger of my patent will not be repeated except as is desired to facilitate an understanding of the practices of this invention.

FIGS. 1–3 illustrate a digger 10 in accordance with this invention with regard to its general mode of operation. As shown therein, a housing or shroud 12 is provided. A digging shaft 14 is mounted across the shroud and is rotated by a drive assembly which includes a drive motor 16 which rotates a sprocket 18 mounted in sprocket cover 20. Sprocket 18 in turn rotates shaft 14 as later described. A plurality of radial tines 22 is mounted on digging shaft 14 to dig into the compost as shaft 14 is rotated.

A hopper or storage compartment 24 is also mounted in shroud 12. Compartment 24 includes a set of discharge hoses 26 each of which leads to a distributor head 28 mounted in the general location of the digging shaft so that the material from the compartment 24 can be applied immediately at the area being treated by the tines 22 digging into the compost.

One aspect of this invention is to provide an improved feed system for feeding the material to the distributor heads. FIGS. 4–10 illustrate the details of that system. FIG. 4 schematically illustrates the operation for conveying the material. As shown therein air is fed through an air regulator 30 controlled by valve 32 to a plurality of inlet hoses 34 into a manifold 36 in communication with the bottom of compartment 24. As later described the material from compartment 24 is received in a plurality of receiving pockets in manifold 36. The discharge or outlet hoses 26 communicate with the pockets and each hose 26 in turn leads to a distributor head 28 which deposits the material 38 onto the mushroom bed 40. The material is discharged through slots 42 in distributor heads 28 to spread the material.

Figure 8:
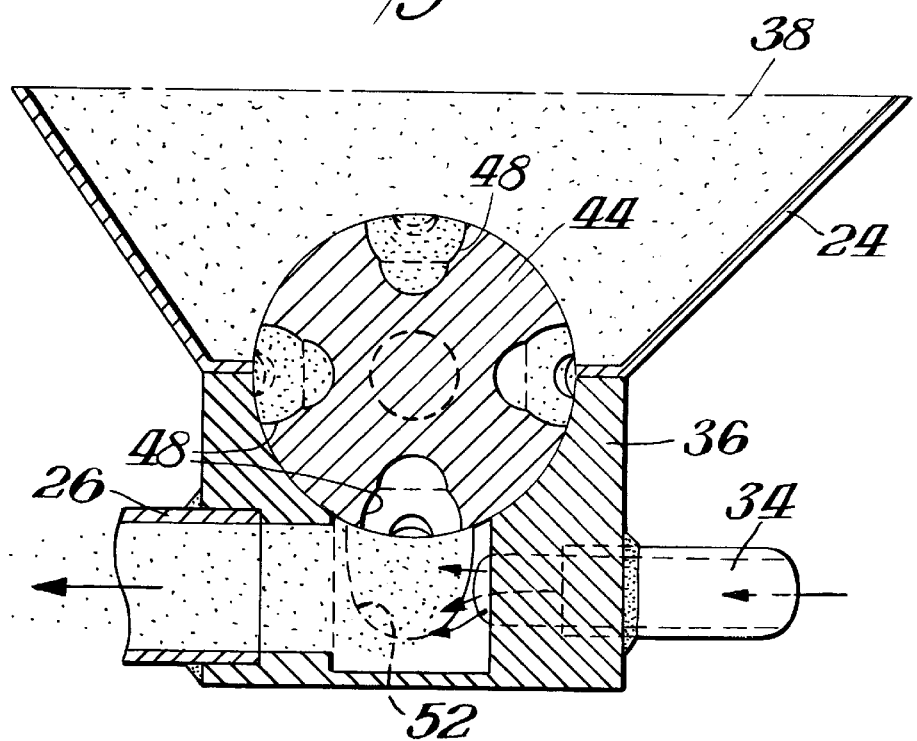
FIG. 8 is a cross-sectional view taken through FIG. 1 along the line 8—8.
Figure 9:
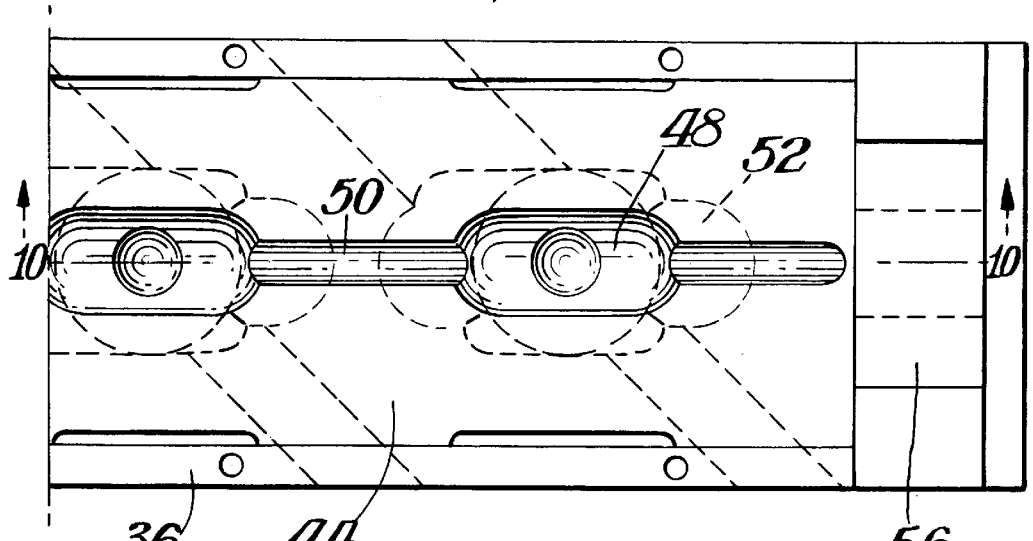
FIG. 9 is a fragmental plan view showing the metering shaft over the distribution manifold in the digger of FIGS. 1–8.
Figure 10:
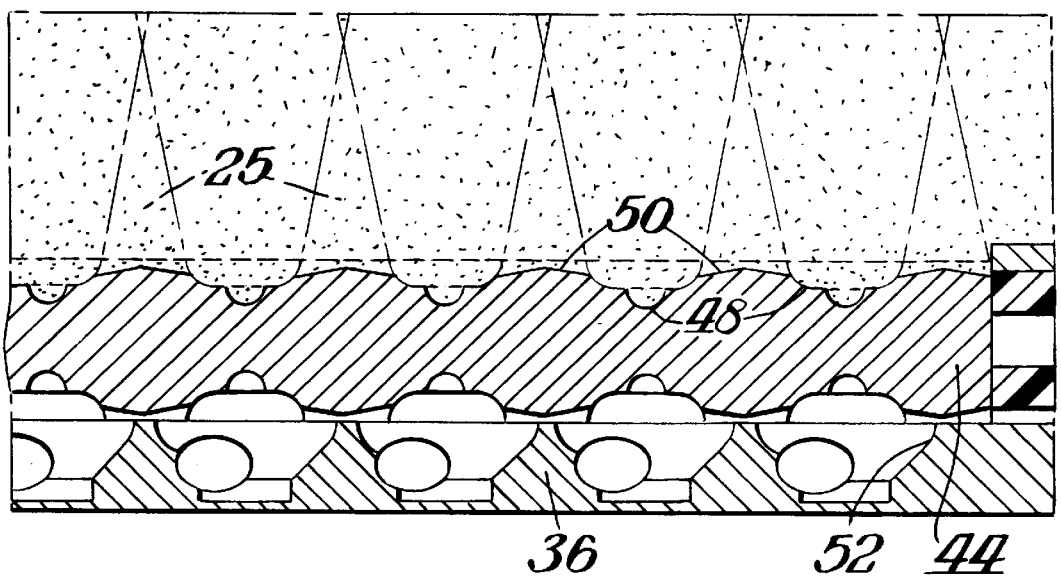
FIG. 10 is a cross-sectional view taken through FIG. 9 along the line 10—10.

In accordance with this invention a metering shaft 44 is provided at the bottom of and extends across the tapered bottom of compartment 24. Metering shaft 44 is rotated in any suitable manner such as by hydraulic motor 46 mounted externally of compartment 24 and secured to shroud 12. As best shown in FIGS. 8 and 10 a plurality of sets of supply pockets 48 is provided in the outer surface of metering shaft 44. Each set of pockets 48 is preferably arranged circumferentially in line with each other. Similarly, each pocket in a set is preferably longitudinally in line with the pockets of the other sets. As shown in FIG. 10 a breaking bridge 50 interconnects the pockets of each set which are longitudinally aligned. Breaking bridge 50 is preferably of a shallow inverted V-shape. The result is that each longitudinally set of aligned supply pockets and the intermediate breaking bridges form a continuous groove longitudinally on the outer surface on the shaft 44 at spaced locations which would correspond to where each pocket 48 is located. Because of this longitudinal groove there are no dead areas in the compartment where the material might otherwise cake and not be distributed. FIG. 10 illustrates such areas 25 which would be dead areas if there were no breaking bridges. As illustrated each receiving pocket 48 is of non-cylindrical form to facilitate the later emptying of the pockets.

As shown in FIG. 8 when shaft 44 rotates each of its supply pockets 48 becomes filled with the material 38. When the pocket is in the twelve o'clock position. The filled pockets rotate in closely dimensioned manifold 36 so that the material remains confined in the pockets 48 until the pockets reach the six o'clock position where the pockets communicate with a corresponding receiving pocket 52 in manifold 36. Each receiving pocket 52 is located between inlet air hose 34 and outlet hose 26 so that the air from hose 34 carries the material 38 into outlet hose 26. Since outlet hose 26 is of larger diameter than inlet hose 24 the air/material is effectively conveyed to its distributor head as previously described.

As illustrated in FIG. 1 each distributor head 28 includes wedge shaped dividers 54 to prevent clogging of the material on the sides of the distributor heads. This general conveying system thus prevents clogging of the material within the compartment 24 as well as in the distributor heads.

Metering shaft 44 is mounted in compartment 24 by having one end secured in bearing block 56 and the other end mounted by plates 58 to motor 46. See FIG. 7. This permits the metering shaft to be easily installed and removed if necessary.

The invention can be broadly practiced with only one receiving pocket for each set of longitudinally spaced pockets. Preferably, however, a plurality of receiving pockets are evenly spaced around the periphery of metering shaft 44 with the pockets circumferentially aligned. Preferably four pockets are in each set. Each pocket being located 90° away from its adjacent pockets. Thus, where six distribution heads are used there would be a total of twenty-four supply pockets and six receiving pockets. If desired, a greater number of pockets could be used in each circumferential set.

The invention may be preferably practiced where each pocket of a circumferential set is in longitudinal alignment with corresponding pockets of the other sets. The invention, however, may also be practiced where the pockets of the circumferential sets are staggered or out of longitudinal alignment with the other sets. In such case, the breaker bridge which interconnects the sets of pockets would be at an angle rather than longitudinally straight across the metering shaft.

Figure 11:
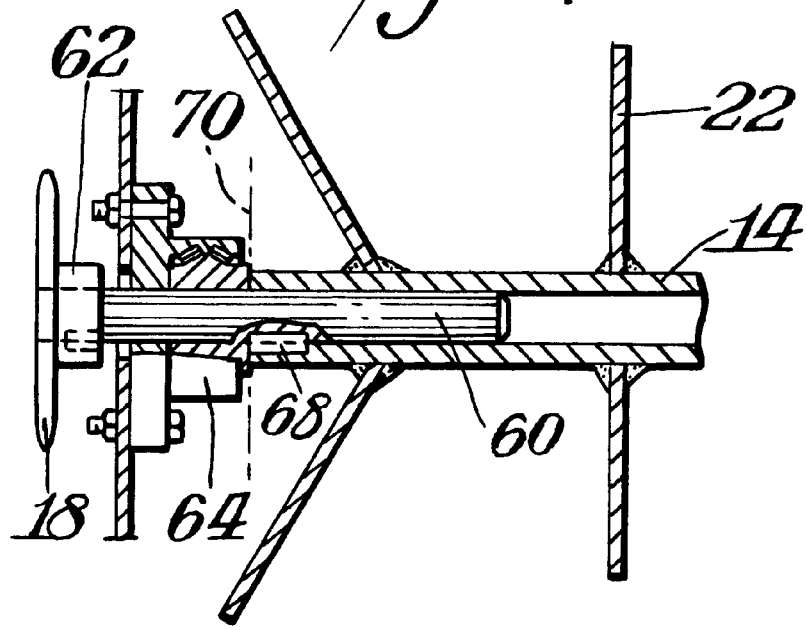
FIG. 11 is a fragmental cross-sectional view in elevation of a prior art digging shaft.
Figure 12:
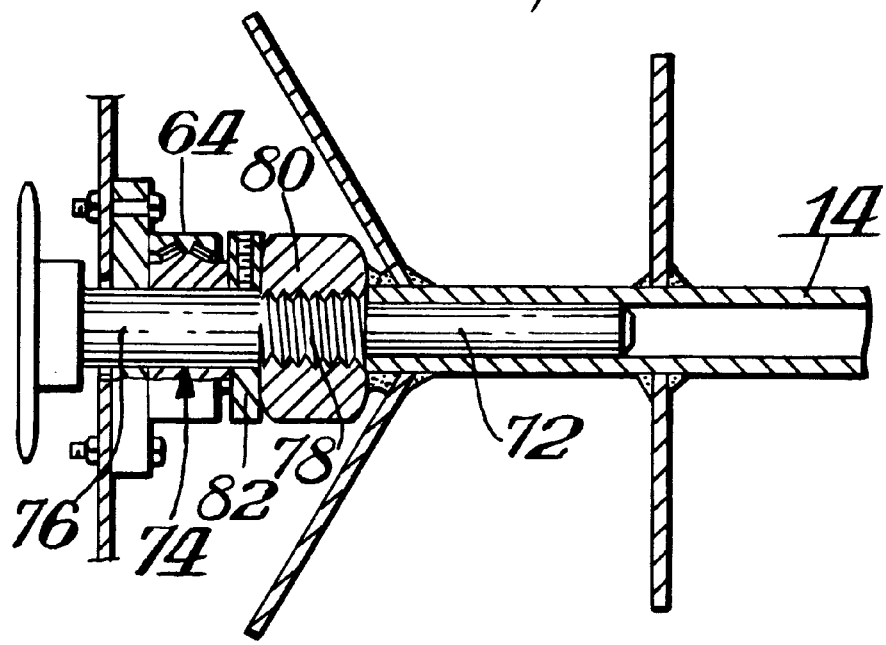
FIG. 12 is a cross-sectional view taken through FIG. 3 along the line 12—12.

FIGS. 11–12 relate to a further aspect of this invention. FIG. 11 illustrates a prior art construction for driving the digging shaft. As shown therein digging shaft 14 is hollow and receives the end 60 of a driving shaft. End 60 is of uniform diameter over the entire length of the shaft which extends to sprocket mount 62. Shaft 60 is also mounted in bearing 64. Driving shaft 60 and digging shaft 14 are connected to each other by a key 68. It has been found that during operation a shear line break 70 occurs which causes failure in the ability to drive digging shaft 14. This occurs, for example, by rollover failure at the key 68 during the course of using the digger.

FIG. 12 illustrates an alternative arrangement in accordance with this invention which overcomes the problem of the structure shown in FIG. 11. As shown in FIG. 12 the hollow digging shaft 14 receives the stub end 72 of a driving shaft 74. Stub end 72 would be of reduced diameter corresponding to the diameter of driving shaft 60 in FIG. 11. In accordance with one aspect of this feature of the invention the drive shaft 74 includes a larger diameter drive portion 76 which is mounted in bearing 64 so as to provide a more sturdy enlarged diameter drive shaft. A further feature of this aspect of the invention is an improved connection of digging shaft 14 to drive shaft 74. This is accomplished by threading a portion 78 of the drive shaft 74 and threadably engaging that portion with a nut 80 permanently secured by welding or other suitable means to the end of digging shaft 14. A collar 82 is mounted between nut 80 and bearing 64 to effectively lock the digging shaft 14 to the drive shaft 74.

In the preferred practice of this invention the improved feed system and the improved drive structure for the digging shaft are both incorporated in the digger. It is to be understood, however, that each feature may operate independently of the other and thus either of the features may be used in arrangements such as my U.S. Pat. No. 5,511,497 without incorporating the other feature.

What is claimed is:

1. In a digger for facilitating application of a material to a mushroom bed wherein said digger includes a compartment for containing a supply of the material to be applied, a longitudinally mounted digging shaft, a plurality of digging tines extending generally radially outwardly from said digging shaft, a drive assembly connected to said digging shaft for rotating said digging shaft to cause said tines to dig into a mushroom bed when said digger is placed on a mushroom bed, conveying structure for conveying the material from said compartment and directing the material toward the mushroom bed generally at the location of said tines digging into the mushroom bed simultaneously with the digging of said tines, the improvement being in that said conveying structure includes a plurality of distributor heads located generally at said tines, a power driven rotatable metering shaft having a plurality of sets of supply pockets for collecting material from said compartment, each of said sets of supply pockets being in periodic communication with a separate outlet hose for depositing the material into a respective said outlet hose during rotation of said metering shaft, each of said outlet hoses leading to a respective one of said distributor heads for supplying the material to said distributor heads, said conveying structure includes a plurality of sets of inlet and outlet hoses, each of said sets of inlet and outlet hoses includes a separate inlet hose for supplying conveying fluid to a respective one of said outlet hoses, said material being deposited into a manifold which interconnects each set of said sets of inlet and outlet hoses, said inlet hose is of smaller diameter than said outlet hose, each of said sets of supply pockets comprises a plurality of circumferentially aligned equally spaced pockets, said compartment having a tapered bottom, said metering shaft being mounted in said tapered bottom of said compartment, said manifold includes a plurality of receiving pockets corresponding in number to the number of sets of said supply pockets and the number of said distributor heads, each pocket of said set of said circumferentially aligned pockets is longitudinally aligned with other supply pockets of said other sets of circumferentially aligned pockets, and said sets of circumferentially aligned pockets communicate with adjacent sets of circumferentially aligned pockets by breaker bridges formed as grooves in an outer surface of said metering shaft.

2. The digger of claim 1 wherein each set of circumferentially aligned supply pockets comprises four pockets.

3. The digger of claim 1 wherein each of said breaker bridges is of shallow inverted V-shape.

4. The digger of claim 3 wherein each of said supply pockets and each of said receiving pockets is of non-cylindrical shape.

5. The digger of claim 4 wherein each of said distributor heads includes wedge shaped dividers.

6. The digger of claim 5 wherein said digging shaft is hollow, a drive shaft is telescoped into said digging shaft, a motor assembly drive said drive shaft, and connecting structure connects said drive shaft to said digging shaft for joint movement of said drive shaft and said digging shaft.

7. The digger of claim 6 wherein said drive shaft has a reduced diameter stub portion in said digging shaft, and said drive shaft has an enlarged diameter portion connected to said motor assembly.

8. The digger of claim 7 wherein said connecting structure is a nut connected to said digging shaft threadably engaged with a threaded portion of said drive shaft.

9. The digger of claim 1 wherein said digging shaft is hollow, a drive shaft is telescoped into said digging shaft, a motor assembly drives said drive shaft, and connecting structure connecting said drive shaft to said digging shaft for joint movement of said drive shaft and said digging shaft.

10. In a digger for facilitating application of a material to a mushroom bed wherein said digger includes a compartment for containing a supply of the material to be applied, a longitudinally mounted digging shaft, a plurality of digging tines extending generally radially outwardly from said digging shaft, a drive assembly connected to said digging shaft for rotating said digging shaft to cause said tines to dig into said mushroom bed when said digger is placed on said mushroom bed, with conveying structure for conveying the material from said compartment and directing the material toward said mushroom bed generally at a location of said tines digging into said mushroom bed simultaneously with the digging of said tines, the improvement being in that said digging shaft being hollow, a drive shaft connected to said drive assembly, said drive shaft terminating in a stub portion telescoped into said hollow digging shaft, said drive shaft including a drive portion operatively connected to and driven by said drive assembly, said drive portion being of larger diameter than said stub portion, and connecting structure connecting said drive shaft to said digging shaft.

11. The digger of claim 10 wherein said drive portion is connected to said digging shaft.

12. The digger of claim 11 wherein said connecting structure comprises a nut connected to said digging shaft, and said nut being threadably engaged with a threaded portion of said drive portion.

13. The digger of claim 12 including a bearing, said drive portion being mounted in said bearing, and a collar between said bearing and said nut.

14. In a digger for facilitating application of a material to a mushroom bed wherein said digger includes a compartment for containing a supply of the material to be applied, a longitudinally mounted digging shaft, a plurality of digging tines extending generally radially outwardly from said digging shaft, a drive assembly connected to said digging shaft for rotating said digging shaft to cause said tines to dig into a mushroom bed when said digger is placed on a mushroom bed, conveying structure for conveying the material from said compartment and directing the material toward the mushroom bed generally at the location of said tines digging into the mushroom bed simultaneously with the digging of said tines, the improvement being in that said conveying structure includes a plurality of distributor heads located generally at said tines, a power driven rotatable metering shaft having a plurality of sets of supply pockets for collecting material from said compartment, each of said sets of supply pockets being in periodic communication with a separate outlet hose for depositing the material into a respective said outlet hose during rotation of said metering shaft, each of said outlet hoses leading to a respective one of said distributor heads for supplying the material to said distributor heads, said digging shaft is hollow, a drive shaft is telescoped into said digging shaft, a motor assembly drives said drive shaft, connecting structure connects said drive shaft to said digging shaft for joint movement of said drive shaft and said digging shaft, said drive shaft has a reduced diameter stub portion in said digging shaft, and said drive shaft has an enlarged diameter portion connected to said motor assembly.

15. The digger of claim 14 wherein said connecting structure is a nut connected to said digging shaft threadably engaged with a threaded portion of said drive shaft.

16. In a digger for facilitating application of a material to a mushroom bed wherein said digger includes a compartment for containing a supply of the material to be applied, a longitudinally mounted digging shaft, a plurality of digging tines extending generally radially outwardly from said digging shaft, a drive assembly connected to said digging shaft for rotating said digging shaft to cause said tines to dig into a mushroom bed when said digger is placed on a mushroom bed, conveying structure for conveying the material from said compartment and directing the material toward the mushroom bed generally at the location of said tines digging into the mushroom bed simultaneously with the digging of said tines, the improvement being in that said conveying structure includes a plurality of distributor heads located generally at said tines, a power driven rotatable metering shaft having a plurality of sets of supply pockets for collecting material from said compartment, each of said sets of supply pockets being in periodic communication with a separate outlet hose for depositing the material into a respective said outlet hose during rotation of said metering shaft, each of said outlet hoses leading to a respective one of said distributor heads for supplying the material to said distributor heads, and said sets of supply pockets communicate with adjacent sets of supply pockets by breaker bridges formed as grooves in an outer surface of said metering shaft.

17. The digger of claim 16 wherein each pocket of said sets of supply pockets is longitudinally aligned with a corresponding supply pocket of its adjacent sets.

* * * * *